United States Patent
Chandra et al.

(10) Patent No.: US 10,999,748 B1
(45) Date of Patent: May 4, 2021

(54) DONOR SELECTION FOR RELAY NODES BASED ON FREQUENCY SEPARATION

(71) Applicant: Sprint Spectrum LP, Overland Park, KS (US)

(72) Inventors: Amrit Kumar Chandra, Ashburn, VA (US); Charles Manganiello, Paola, KS (US); David Zhijun Sun, Broadlands, VA (US); Jay R. Chernoff, Pawleys Island, SC (US); Kristian Kai Johns, Ashburn, VA (US); Liang Li, Darnestown, MD (US); Mayur Shirwadkar, Arlington, VA (US); Neehar Kulkarni, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/710,339

(22) Filed: Dec. 11, 2019

(51) Int. Cl.
*H04W 16/32* (2009.01)
*H04W 72/04* (2009.01)
*H04W 92/12* (2009.01)

(52) U.S. Cl.
CPC ....... *H04W 16/32* (2013.01); *H04W 72/0433* (2013.01); *H04W 72/0453* (2013.01); *H04W 92/12* (2013.01)

(58) Field of Classification Search
CPC ............. H04W 16/32; H04W 72/0453; H04W 72/0433; H04W 92/12
See application file for complete search history.

(56) References Cited

U.S. PATENT DOCUMENTS

| | | | | |
|---|---|---|---|---|
| 5,479,400 A * | 12/1995 | Dilworth | ............... | H04B 1/713 370/331 |
| 7,574,179 B2 * | 8/2009 | Barak | ................. | H04B 7/0613 455/101 |
| 7,620,370 B2 * | 11/2009 | Barak | .................. | H04W 16/10 370/480 |
| 8,103,310 B1 * | 1/2012 | Srinivas | ............... | H04W 28/08 455/561 |
| 9,179,444 B2 * | 11/2015 | Van Phan | ............. | H04W 72/04 |
| 9,565,566 B1 * | 2/2017 | Boppana | .................. | H04B 1/40 |
| 10,298,313 B2 * | 5/2019 | Liu | .................... | H04B 7/15507 |
| 2013/0195057 A1 * | 8/2013 | Dinan | ............... | H04W 72/0453 370/329 |
| 2013/0279346 A1 * | 10/2013 | Zhang | .................. | H04W 24/08 370/241.1 |
| 2015/0078162 A1 * | 3/2015 | Prakash | ................ | H04W 28/08 370/235 |
| 2015/0288809 A1 * | 10/2015 | Liang | .................... | H04W 16/14 455/419 |
| 2016/0338133 A1 * | 11/2016 | Lee | ........................ | H04W 76/16 |
| 2018/0167972 A1 * | 6/2018 | Egner | .................. | H04W 48/16 |

* cited by examiner

*Primary Examiner* — Julio R Perez (57) ABSTRACT

Selecting a donor access node for a relay node includes identifying operating frequencies for carriers deployed by the relay node, and determining backhaul frequencies that minimize interference with the operating frequencies, including identifying frequency bands that are separated from the one or more operating frequencies by at least a threshold amount. Primary and secondary carriers can be identified and communicated with potential donor access nodes.

14 Claims, 7 Drawing Sheets

DONOR SELECTION FOR RELAY NODES BASED ON FREQUENCY SEPARATION

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement relay nodes for relaying communication between a base station or donor access node, and an end-user wireless device. Combinations of wireless devices designated as relays (henceforth, "relay wireless devices") that are co-located with relay access points may be used at the edge of a coverage area of a donor access node to improve coverage and/or service, as well as in crowded areas having a high number of other wireless devices to increase the available throughput to the end-user wireless devices being relayed. For the purposes of this disclosure, a wireless connection between a donor access node and a relay node or relay wireless device is referred to as a "backhaul connection" or simply "backhaul." Further, the relay node or relay access point deploys a carrier using an "operating frequency" to which the end-user wireless devices can attach.

With the increasing implementation of various access nodes and overlapping radio access technologies (RATs) such as 5G New Radio (NR) over existing RATs such as 3G and 4G Long Term Evolution (LTE), there are additional considerations regarding how relay nodes can effectively service wireless devices that are attached to it. In particular, when a relay node attaches to a donor access node over a backhaul connection that utilizes a frequency relatively close to the operating frequency of the relay node itself, interference may be caused to either the backhaul connection or to the end-user wireless devices attached to the relay node. This causes service interruptions to users of wireless devices connected to the relay node, and unnecessary signaling to disconnect and reconnect between donor access nodes. Further, there exists no means in the art for a donor access node to assign primary and secondary carriers (for relay nodes capable of carrier aggregation) that would not cause interference to operating frequencies deployed by relay nodes.

Overview

Exemplary embodiments described herein include systems, methods, and processing nodes for selecting a donor access node for a relay node based on a threshold amount of separation between the operating frequency of the relay node and a backhaul frequency of the donor access node. In an exemplary embodiment, a method for selecting a donor access node for a relay node includes identifying one or more operating frequencies for a first one or more carriers deployed by the relay node, and determining one or more backhaul frequencies that minimize interference with the one or more operating frequencies, wherein the one or more backhaul frequencies are associated with a second one or more carriers to which the relay node can attach.

In another exemplary embodiment, a system for selecting a donor access node for a relay node includes a processing node, and a processor coupled to the processing node, the processor configured to perform operations including identifying one or more operating frequencies for a first one or more carriers deployed by a relay node, wherein the relay node is configured to relay traffic between one or more donor access nodes and one or more end-user wireless attached to the first one or more carriers, and instructing the relay node to attach to at least one carrier deployed by a donor access node, the at least one carrier utilizing a backhaul frequency separated from the one or more operating frequencies by at least a threshold amount.

In another exemplary embodiment, a processing node for selecting a donor access node for a relay node is configured to perform operations including identifying a donor access node for a relay node based on the donor access node being configured to utilize a first frequency band separated from an operating frequency of the relay node by at least a threshold amount, and instructing the relay node to attaching to a primary carrier deployed by the donor access node, the primary carrier utilizing the first frequency band, wherein the operating frequency of the relay node is used by end-user wireless devices to attach to the relay node to communicate with the donor access node via the relay node.

DETAILED DESCRIPTION

Exemplary relay nodes described herein are be configured to relay data between an access node (i.e. "donor" access node) and one or more end-user wireless devices attached to the relay node. In exemplary embodiments described herein, a relay node can be configured to select or control primary and secondary carriers to which it attaches, so as to reduce interference and improve performance. For example, relay nodes disclosed herein can be instructed to maintain a list of primary carriers to which they are allowed to (or prefer to) attach. The primary carriers can be identified by a carrier identifier, such as an E-UTRA Absolute Radio Frequency Channel Number (EARFCN), or any other identifier known in the art. The primary carriers are determined based on a frequency separation between the operating frequency of the relay node and the frequencies utilized by the primary carrier (i.e. backhaul frequency). A minimum threshold amount of separation is used to determine the preferred or allowed primary carriers.

Further, for each primary carrier stored in the list, a list of secondary carriers can also be determined. For example, the secondary carrier list for each primary carrier contains a list of secondary carrier EARFCNs (or equivalent identifiers). Thus, when the relay node scans for potential donor access nodes (based on, for example, a threshold signal level), the relay node also selects a primary carrier to attach to based on a comparison of the measured carriers with the list stored on the relay node. Further, after the primary carrier is selected, the relay node connects to the primary carrier of the donor access node, and sends the list of secondary carriers corresponding to the primary carrier to the donor access node. In response, the donor access node can assign a secondary carrier for the relay node based on the received list. Both primary and secondary carriers are separated from one or more operating frequencies of the relay node by at least a threshold amount, so as to minimize interference between the donor access node and the relay node, thereby improving performance of the relay node.

The relay node may be a small cell access node, a home eNodeB, etc. In an exemplary embodiment, the relay node includes a relay wireless device coupled to a relay access point, and is configured to relay data packets between an access node and an end-user wireless device attached to a wireless air interface deployed by the relay access point. Thus, the operations described herein can be performed by the relay wireless device. Alternatively, the relay node is a combined unit that includes transceivers configured to communicate with a relay node and to deploy a wireless air interface to which end-user wireless devices can attach. Thus, the operations described herein can be performed by the combined relay node. Further, the donor access node may include an access node of any type, including macrocell access nodes such as Long-Term-Evolution (LTE) eNodeBs or 5G New Radio (NR) gNodeBs, mini access nodes, home eNodeBs or gNodeBs, etc. These and other embodiments are further described herein and with reference to FIGS. 1-8.

Figure 1:
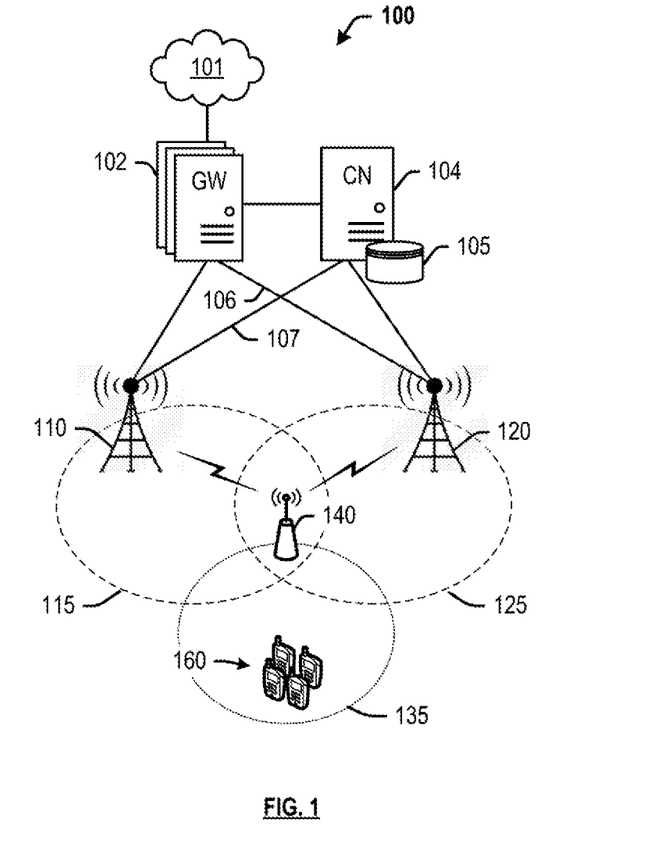
FIG. 1 depicts an exemplary system for selecting a donor access node for a relay node.

FIG. 1 depicts an exemplary system 100 comprising a communication network 101, gateway 102, controller node 104, access node 110, access node 120, relay node 140, and end-user wireless devices 160. Access node 110 is configured to deploy a radio air interface over a coverage area 115, and access node 120 is configured to deploy a radio air interface over a coverage area 125. By virtue of being within both coverage areas 115 and 125, relay node 140 can be in direct communication with either or both access nodes 110, 120. Further, relay node 140 may be configured to deploy another carrier over a coverage area 135 to which end-user wireless devices 160 can attach. Relay node 140 can be configured to relay data packets between end-user wireless devices 160 and one or both of access nodes 110, 120, which may be referred to as "donor" access nodes when communicating via relay node 140. Thus, wireless devices 160 that are outside a coverage area of donor access nodes 110, 120 may access network services from donor access nodes 110, 120 by virtue of being connected to relay node 140.

Moreover, a processing node within system 100 (for example, communicatively coupled to access nodes 110, 120, controller node 104, relay node 140, or any other network node) can be configured to select a donor access node for relay node 140 from among donor access nodes 110, 120, based in part on a reference signal strength from each donor access node 110, 120, and in part on a frequency utilized by each of donor access nodes 110, 120. For example, relay node 140 can scan for reference signals transmitted from the potential donor access nodes 110, 120. The scanning may be performed by rotating an antenna on relay node 140, or switching to different directional antennae in different directions and performing measurements from each different antenna. Further, the relay node 140 is configured to determine reference signal strengths for each reference signal received at the one or more antennae, and compare the reference signal strengths with a minimum threshold to determine whether or not a donor access node is a potential donor access node.

Further, relay node 140 is configured to identifying one or more operating frequencies for a carrier deployed by the relay node 140 (to which end-user wireless devices 160 attach), and determine one or more backhaul frequencies that minimize interference with the one or more operating frequencies. The one or more backhaul frequencies may include frequencies utilized by the one or more carriers deployed by either of donor access nodes 110, 120, to which the relay node can attach. Determining the one or more backhaul frequencies that minimize interference with the one or more operating frequencies of relay node 140 includes identifying frequency bands that are separated from the one or more operating frequencies by at least a threshold amount. For example, relay node 140 is programmed with a defined set of frequencies that can be used by the carrier deployed therefrom, and a plurality of backhaul frequencies can be determined that are at least a threshold amount separate from the defined set of frequencies. These backhaul frequencies can be stored on a list on the relay node 140. In an exemplary embodiment, relay node 140 is configured to store carrier identifiers associated with the backhaul frequencies, such as an EARFCN or similar identifier. Further in an exemplary embodiment, the threshold amount of separation between operating frequencies of the relay node 140 and backhaul frequencies is 50 MHz. Thus, when relay node 140 scans for potential donor access nodes from among donor access nodes 110, 120, relay node 140 can identify a first donor access node (e.g. donor access node 110) as being configured to deploy a carrier utilizing a first frequency from among the one or more backhaul frequencies stored on the relay node 140. Subsequently, relay node 140 can request to attach to the carrier deployed by donor access node 110.

Relay node 140 (or a processing node communicatively coupled thereto) can further be configured to determine one or more secondary backhaul frequencies for one or more backhaul frequencies determined above. In one exemplary embodiment, when relay node 140 determines the one or more backhaul frequencies (such as the EARFCNs of carriers that utilize frequencies that are separate from the operating frequencies of the relay node by the threshold amount), relay node 140 can determine secondary backhaul frequencies for each backhaul frequency. For example, the backhaul frequency (and/or EARFCN associated therewith) can be used to identify a primary carrier to which the relay node 140 prefers to attach, and the secondary backhaul frequencies associated with the backhaul frequency include any carrier deployed from the same donor access node that can be used as a secondary carrier. In another exemplary embodiment, upon attaching to access node 110 (as described above), relay node 140 can determine the secondary backhaul frequencies. Whether the secondary backhaul frequencies are determined beforehand for each backhaul frequency or subsequent to identifying and attaching to a donor access node using the backhaul frequency, relay node 140 is configured to transmit the secondary backhaul frequencies to the donor access node 110. Upon receipt, the donor access node 110 is configured to identify a second carrier deployed therefrom that utilizes a second frequency from among the one or more secondary backhaul frequencies, and communicate with the relay node 140 using the first carrier as a primary component carrier and the second carrier as a secondary component carrier. Both the first frequency and the second frequency are separated from the one or more operating frequencies by at least the threshold amount. Further, the first frequency can be separated from the one or more operating frequencies by a greater amount than the second frequency, so as to minimize interference between carrier spanning coverage area 115 and carrier spanning coverage area 135.

Thus, as described herein, system 100 can be enabled to selecting a donor access node from among donor access nodes 110, 120 for relay node 140 by including a processing node configured to identify one or more operating frequencies for a first one or more carriers deployed by relay node 140, and instructing relay node 140 to attach to at least one carrier deployed by a donor access node 110, 120, the at least one carrier utilizing a backhaul frequency separated from the one or more operating frequencies by at least a threshold amount, such that a maximum allowable amount of interference is caused to the one or more operating frequencies. Alternatively or on addition, a processing node within system 100 can be configured to select a donor access node for relay node 140 by identifying a donor access node based on the donor access node being configured to utilize a first frequency band separated from an operating frequency of the relay node 140 by at least a threshold amount, and instructing the relay node to attach to a primary carrier deployed by the donor access node, the primary carrier utilizing the first frequency band, and attaching to a secondary carrier deployed by the donor access node, the secondary carrier utilizing a second frequency band from among the list of known frequency bands. Further, it may be determined that a second donor access node (e.g. donor access node 120) utilizes a third frequency band separated from the operating frequency of the relay node 140 by less than the threshold amount, in response to which relay node 140 is instructed to avoid attempting to attach to the second donor access node 120.

Access nodes 110, 120 can be any network node configured to provide communication between relay node 140 and other wireless devices (not shown herein) and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area 115, 125 in the range of approximately five kilometers to thirty-five kilometers and an output power in the tens of watts. Further, relay node 140 may comprise any combination of a relay wireless device capable of communicating over a wireless backhaul, and a small-cell access node capable of deploying a wireless air interface for wireless devices 160. Relay node 140 may comprise any short range, low power, small-cell access nodes such as a microcell access node, a picocell access node, a femtocell access node, or a home eNodeB device.

Access nodes 110, 120 and relay node 140 can comprise a processor and associated circuitry to execute or direct the execution of computer-readable instructions to perform operations such as those further described herein. Briefly, access nodes 110, 120 and relay node 140 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 and relay node 140 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link.

Components of exemplary access nodes 110, 120, relay node 140, and processing nodes coupled thereto, are further described with reference to FIGS. 2-5.

Wireless devices 160 may be any device, system, combination of devices, or other such communication platform capable of communicating wirelessly with access node 110, 120 and/or relay node 140 using one or more frequency bands deployed therefrom. Each of wireless devices 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay node 140 and wireless devices 160. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a packet data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as backhaul frequencies and carrier identifiers of access nodes 110, 120, backhaul frequencies and operating frequencies of relay node 140, and so on. This information may be requested by or shared with access nodes 110, 120, or relay node 140 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access nodes 110, 120, relay node 140, controller node 104, and/or networks 101, 201.

Figure 2:
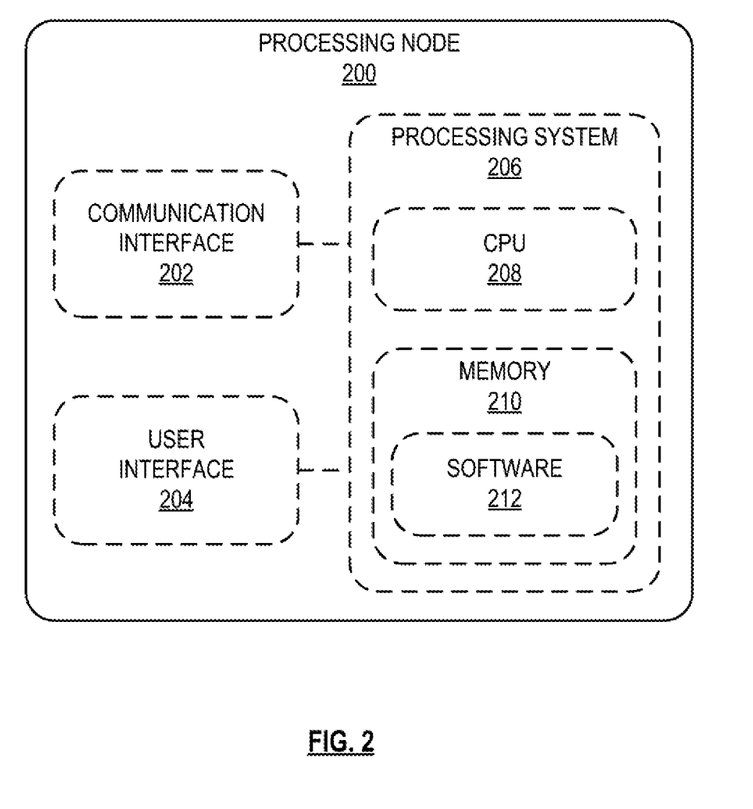
FIG. 2 depicts an exemplary processing node.

FIG. 2 depicts an exemplary processing node 200 for mitigating interference. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the interference mitigation operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for identifying one or more operating frequencies for a first one or more carriers deployed by the relay node, and determining one or more backhaul frequencies that minimize interference with the one or more operating frequencies, wherein the one or more backhaul frequencies are associated with one or more carriers to which the relay node can attach. In another exemplary embodiment, software 212 can include instructions for identifying one or more operating frequencies for a first one or more carriers deployed by a relay node, wherein the relay node is configured to relay traffic between one or more donor access nodes and one or more end-user wireless attached to the first one or more carriers, and attaching to at least one carrier deployed by a donor access node, the at least one carrier utilizing a backhaul frequency separated from the one or more operating frequencies by at least a threshold amount. In another exemplary embodiment, software 212 can include instructions for identifying a donor access node for a relay node based on the donor access node being configured to utilize a first frequency band separated from an operating frequency of the relay node by at least a threshold amount, and attaching to a primary carrier deployed by the donor access node, the primary carrier utilizing the first frequency band, wherein the operating frequency of the relay node is used by end-user wireless devices to attach to the relay node to communicate with the donor access node via the relay node.

Figure 3:
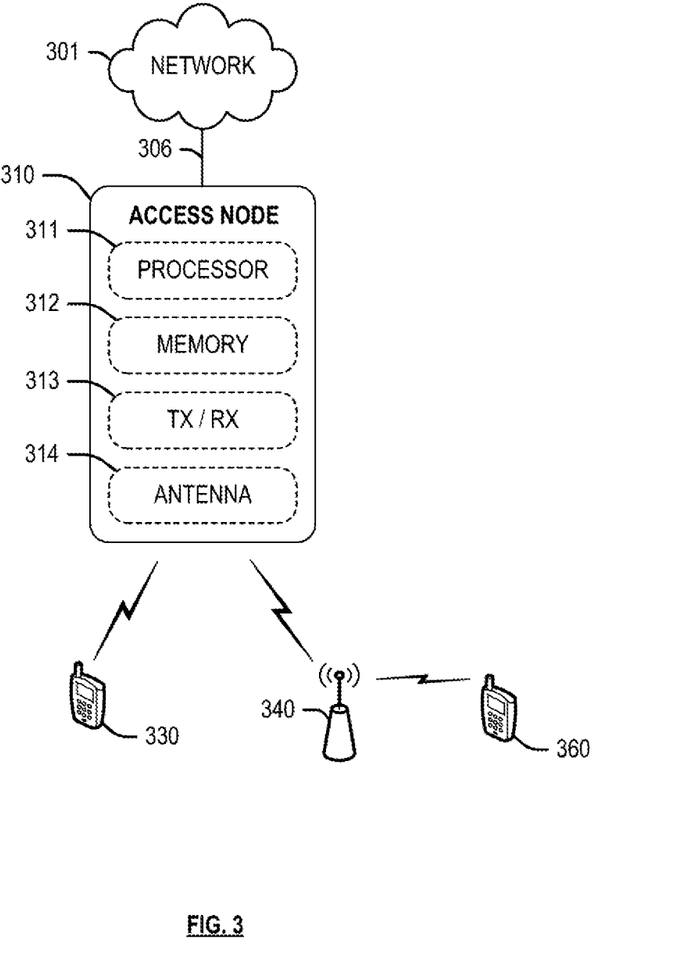
FIG. 3 depicts an exemplary access node.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, transceiver 313, and antenna 314. Processor 311 executes instructions stored on memory 312, while transceiver 313 and antenna 314 enable wireless communication with wireless device 330 and relay node 340. Further, antenna 314 may include an array of antennae that are configured to deploy a radio air interface over one or more wireless sectors, form beams within these sectors, employ multiple-input-multiple-output (MIMO), etc.

Figure 4:
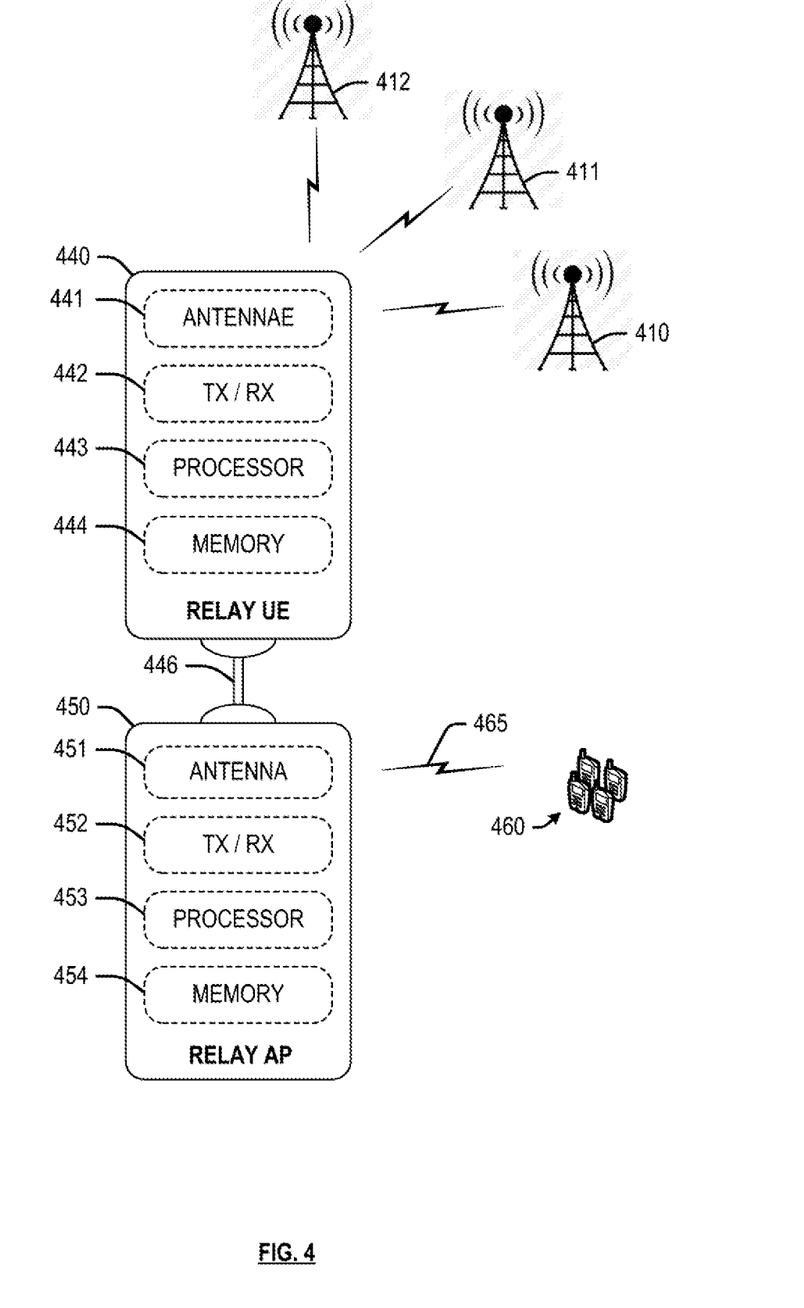
FIG. 4 depicts an exemplary relay node comprising a relay wireless device and a relay access point.

FIG. 4 depicts an exemplary relay node comprising a relay wireless device 440 and a relay access point (AP) 450. Relay wireless device 440 is illustrated as comprising a plurality of antennae 441 enabling communication with a plurality of donor access nodes 410, 411, 412, one or more transceivers 442, a processor 443, and a memory 444 for storing instructions that enable relay wireless device 440 to perform operations described herein. In some embodiments, relay wireless device 440 is referred to as a customer premise equipment (CPE), which includes any stationary LTE and/or 5G NR wireless device having a stronger computational & RF capability versus standard wireless devices, as well as a directional antenna and a dedicated power supply, enabling relay wireless device 440 to efficiently provide resources to wireless devices 460 via relay access point 450. Consequently, relay access point 450 may be co-located with relay wireless device 440, and is connected to relay wireless device 440 via a communication interface 446. Communication interface 446 may be any interface that enables direct communication between relay wireless device 440 and relay access point 450, such as USB, FireWire, Ethernet, or any other serial, parallel, analog, or digital interface.

In operation, relay wireless device 440 may be configured to relay network services from donor access nodes 410, 411, 412 to wireless devices 460 via relay access point 450. Relay wireless device 440 may begin to function as a relay wireless device by sending a message to donor access nodes 410, 411, 412 to indicate to donor access nodes 410, 411, 412 that wireless device 440 is functioning as a relay wireless device. In some embodiments, relay wireless device 440 can request to send a buffer status report to donor access nodes 410, 411, 412. Donor access nodes 410, 411, 412 can grant this request in a conventional manner. Relay wireless device 440 may respond to the grant by sending a short buffer status report. This short buffer status report is associated with a logical channel group that indicates the buffer status report is communicating the status of relay wireless device 440 as a relay, and thus is not asking for additional resource allocations (like a 'conventional' buffer status report would indicate). In other words, when relay wireless device 440 responds with a buffer status report for the 'special' logical channel group, it means that the buffer status report is not actually reporting the status of a buffer. Rather, this buffer status report indicates that the wireless device is now functioning as a relay. Once status of relay wireless device 440 is established, relay wireless device 440 may instruct relay access point 450 to start accepting connection requests from one or more wireless devices such as wireless device 460. Further, relay access point 450 is illustrated as comprising an antenna 451 and transceiver 452 for enabling communication with wireless device 460, processor 453, and a memory 454 for storing instructions that are executed by processor 453. In some embodiments, relay access point 450 may be a home eNodeB. Moreover, although only one transceiver is depicted in each of relay wireless device 440 and relay access point 450, additional transceivers may be incorporated in order to facilitate communication across interface 446 and other network elements.

Further, memory 444 on relay UE 440 may include instructions for identifying one or more operating frequencies for a carrier 465 deployed by the relay access point 450 (to which end-user wireless devices 460 attach), and determine one or more backhaul frequencies that minimize interference with the one or more operating frequencies. The one or more backhaul frequencies may include frequencies utilized by the one or more carriers deployed by either of donor access nodes 410, 411, 412 to which the relay UE 440 can attach. Determining the one or more backhaul frequencies that minimize interference with the one or more operating frequencies of relay access point 450 includes identifying frequency bands that are separated from the one or more operating frequencies by at least a threshold amount. For example, relay access point 450 is programmed with a defined set of frequencies that can be used by the carrier 465 deployed therefrom, and a plurality of backhaul frequencies can be determined that are at least a threshold amount separate from the defined set of frequencies. These backhaul frequencies can be stored on a list on memory 444 of relay UE 440. In an exemplary embodiment, relay UE 440 is configured to store carrier identifiers associated with the backhaul frequencies, such as an EARFCN or similar identifier. Further in an exemplary embodiment, the threshold amount of separation between operating frequencies of the relay access point 450 and backhaul frequencies is 50 MHz. Thus, when relay UE 440 scans for potential donor access nodes from among donor access nodes 410, 411, 412, relay UE 440 can identify a first donor access node (e.g. donor access node 410) as being configured to deploy a carrier utilizing a first frequency from among the one or more backhaul frequencies stored on the memory 444. Subsequently, relay UE 440 can request to attach to the carrier deployed by donor access node 410.

Relay UE 440 (or a processing node communicatively coupled thereto) can further be configured to determine one or more secondary backhaul frequencies for one or more backhaul frequencies determined above. In one exemplary embodiment, when relay UE 440 determines the one or more backhaul frequencies (such as the EARFCNs of carriers that utilize frequencies that are separate from the operating frequencies of the relay node by the threshold amount), relay UE 440 can determine secondary backhaul frequencies for each backhaul frequency. For example, the backhaul frequency (and/or EARFCN associated therewith) can be used to identify a primary carrier to which the relay UE 440 prefers to attach, and the secondary backhaul frequencies associated with the backhaul frequency include any carrier deployed from the same donor access node that can be used as a secondary carrier. In another exemplary embodiment, upon attaching to access node 410 (as described above), relay UE 440 can determine the secondary backhaul frequencies. Whether the secondary backhaul frequencies are determined beforehand for each backhaul frequency or subsequent to identifying and attaching to a donor access node using the backhaul frequency, relay UE 440 is configured to transmit the secondary backhaul frequencies to the donor access node 410. Upon receipt, the donor access node 410 is configured to identify a second carrier deployed therefrom that utilizes a second frequency from among the one or more secondary backhaul frequencies, and communicate with the relay UE 440 using the first carrier as a primary component carrier and the second carrier as a secondary component carrier. Both the first frequency and the second frequency are separated from the one or more operating frequencies by at least the threshold amount. Further, the first frequency can be separated from the one or more operating frequencies by a greater amount than the second frequency.

Figure 5:
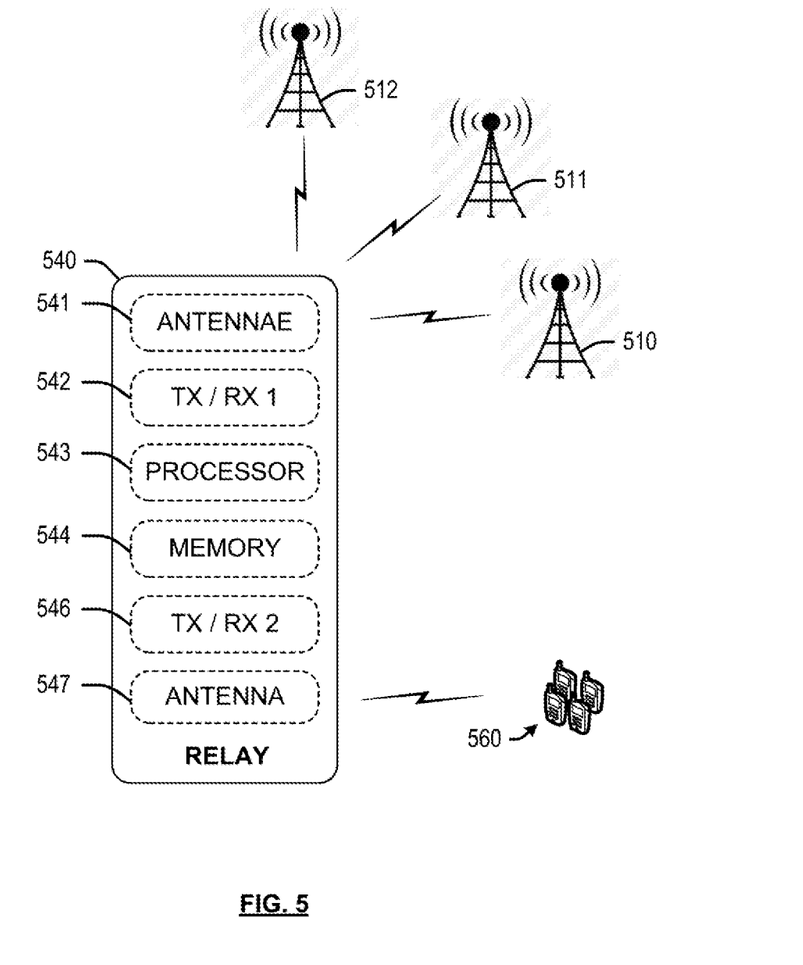
FIG. 5 depicts another exemplary relay node combining a relay wireless device and a relay access point.

In another exemplary embodiment, the relay node may integrate components of both relay wireless device 440 and relay access point 450 into a single unit. FIG. 5 depicts an exemplary relay node 540 of this type. Relay node 540 is illustrated as comprising a plurality of antennae 541 for enabling communication with a plurality of donor access nodes 510, 511, 512, one or more transceivers 542, a processor 543, and a memory 544 for storing instructions that are executed by processor 543 as described herein. Relay node 540 further includes another transceiver 546 and antenna 547 for enabling communication with wireless device 560. Memory 544 can include instructions that enable relay node 540 to perform operations similar to those described above with respect to FIG. 4.

In an embodiment, the relay nodes depicted in FIGS. 4-5 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to end-user wireless devices. Likewise, RF signals received from end-user wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively, or in addition, a layer 3 relay node also performs a decode and forward function. However, a layer 3 relay node also performs additional processing (such as ciphering and/or data concatenation/segmentation/reassembly). In other words, relay node depicted herein performs demodulation and decoding of the received RF signals (either uplink or downlink), processes received data, then encodes, modulates, and transmits the data to a wireless device.

Figure 6:
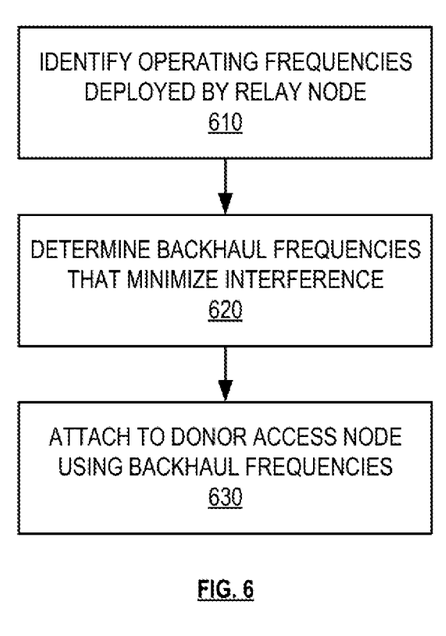
FIG. 6 depicts an exemplary method for selecting a donor access node for a relay node based on a frequency separation.

FIG. 6 depicts an exemplary method for selecting a donor access node for a relay node. The method of FIG. 6 may be implemented by a processing node communicatively coupled to one or more donor access nodes, relay nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, the method includes identifying one or more operating frequencies for a carrier deployed by a relay node (to which end-user wireless devices attach), and at 620, determining one or more backhaul frequencies that minimize interference with the one or more operating frequencies. The one or more backhaul frequencies may include frequencies utilized by the one or more carriers deployed by donor access nodes to which the relay node can attach. Determining the one or more backhaul frequencies that minimize interference with the one or more operating frequencies of the relay node includes identifying frequency bands that are separated from the one or more operating frequencies by at least a threshold amount. For example, the relay node is programmed with a defined set of frequencies that can be used by the carrier deployed therefrom, and a plurality of backhaul frequencies can be determined that are at least a threshold amount separate from the defined set of frequencies. These backhaul frequencies can be stored on a list on the relay node. In an exemplary embodiment, the relay node is configured to store carrier identifiers associated with the backhaul frequencies, such as an EARFCN or similar identifier. Further in an exemplary embodiment, the threshold amount of separation between operating frequencies of the relay node and backhaul frequencies is 50 MHz. Further, for each primary carrier stored in the list, a list of secondary carriers can also be determined. For example, the secondary carrier list for each primary carrier contains a list of secondary carrier EARFCNs (or equivalent identifiers). Thus, when the relay node scans for potential donor access nodes (based on, for example, a threshold signal level), the relay node also selects a primary carrier to attach to based on a comparison of the measured carriers with the list stored on the relay node.

Thus, when the relay node scans for potential donor access nodes, the relay node can identify a first donor access node as being configured to deploy a carrier utilizing a first frequency from among the one or more backhaul frequencies stored on the relay node. Subsequently, at 630, the relay node can request to attach to the carrier deployed by the identified donor access node.

Figure 7:
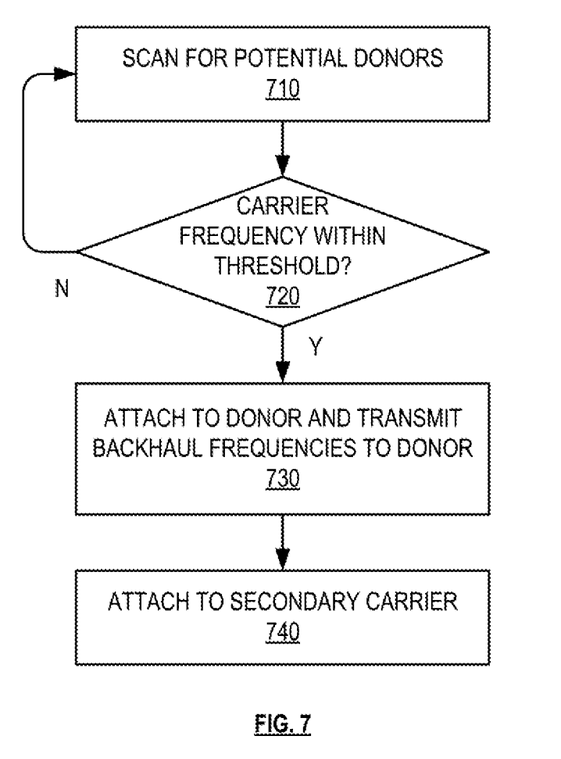
FIG. 7 depict another exemplary method for selecting a donor access node.

FIG. 7 depicts another exemplary method for selecting a donor access node for a relay node. The method of FIG. 7 may be implemented by a processing node communicatively coupled to one or more donor access nodes, relay nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, a relay node can scan for reference signals transmitted from one or more potential donor access nodes. The scanning may be performed by rotating an antenna on the relay node, or switching to different directional antennae in different directions and performing measurements from each different antenna. Further, the relay node is configured to determine reference signal strengths for each reference signal received at the one or more antennae, and compare the reference signal strengths with a minimum threshold to determine whether or not a donor access node is a potential donor access node. In addition, at 720, the relay node can determine whether or not a carrier frequency deployed by a potential donor access node is within a threshold. For example, as described above, one or more operating frequencies are determined for a relay node, and one or more backhaul frequencies that minimize interference with the one or more operating frequencies are also determined. The one or more backhaul frequencies may include frequencies utilized by the one or more carriers deployed by donor access nodes to which the relay node can attach, and carrier identifiers of primary carriers stored in a list on the relay node. Further, for each primary carrier stored in the list, a list of secondary carriers can also be determined. For example, the secondary carrier list for each primary carrier contains a list of secondary carrier EARFCNs (or equivalent identifiers). Table 1 below illustrates an exemplary list of primary carriers and potential secondary carriers. With reference to Table 1 below, for each primary carrier from among n carriers (e.g. P1 ... Pn), there are m secondary carriers (e.g. S11 ... S1m for P1, S21 ... S2m for P2, etc.).

TABLE 1

| P1  | P2  | ... | Pn  |
|-----|-----|-----|-----|
| S11 | S21 | ... | Sn1 |
| S12 | S22 | ... | Sn2 |
| ... | ... | ... | ... |
| S1m | S2m | ... | Snm |

Thus, when the relay node scans for potential donor access nodes (based on, for example, a threshold signal level), the relay node also selects a primary carrier to attach to based on a comparison of the measured carriers with the list stored on the relay node.

Figure 8:
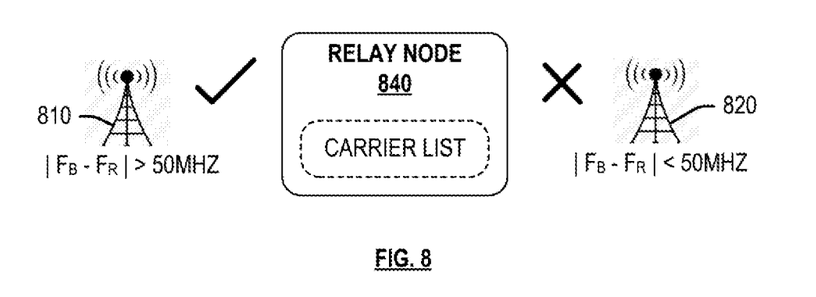
FIG. 8 depicts exemplary selections of donor access nodes for a relay node based on frequency separation.

Further, at 730, after the primary carrier is selected, the relay node connects to the primary carrier of the donor access node, and sends the list of secondary carriers corresponding to the primary carrier to the donor access node. In response, the donor access node can assign a secondary carrier for the relay node based on the received list such at, at 730, the relay node can also attach to the secondary carrier. Both primary and secondary carriers are separated from one or more operating frequencies of the relay node by at least a threshold amount, so as to minimize interference between the donor access node and the relay node, thereby improving performance of the relay node FIG. 8 depicts exemplary selections of donor access nodes for a relay node based on frequency separation. Access nodes 810 and 820 are similar to access nodes 110, 120 in FIG. 1, and relay node 840 may be considered similar to relay node 140. The relay node 840 is configured to identifying one or more operating frequencies for a carrier deployed by the relay node 840 (to which end-user wireless devices can attach), and determine one or more backhaul frequencies that minimize interference with the one or more operating frequencies. The one or more backhaul frequencies may include frequencies utilized by the one or more carriers deployed by either of donor access nodes 810, 820, to which the relay node 840 can attach. Determining the one or more backhaul frequencies that minimize interference with the one or more operating frequencies of relay node 840 includes identifying frequency bands that are separated from the one or more operating frequencies by at least a threshold amount. For example, relay node 840 is programmed with a defined set of frequencies that can be used by the carrier deployed therefrom, and a plurality of backhaul frequencies can be determined that are at least a threshold amount separate from the defined set of frequencies. These backhaul frequencies can be stored on a list on the relay node 840. In an exemplary embodiment, relay node 840 is configured to store carrier identifiers associated with the backhaul frequencies, such as an EARFCN or similar identifier, in a carrier list. Further in an exemplary embodiment, the threshold amount of separation between operating frequencies of the relay node 840 and backhaul frequencies is 50 MHz. Thus, when relay node 840 scans for potential donor access nodes from among donor access nodes 810, 820, relay node 840 can identify a first donor access node (e.g. donor access node 810) as being configured to deploy a carrier utilizing a first frequency from among the one or more backhaul frequencies stored on the relay node 840. Subsequently, relay node 840 can request to attach to the carrier deployed by donor access node 810. Conversely, since the frequency of donor access node 820 is less than the threshold amount separate from the operating frequency, donor access node 820 is not selected by relay node 840.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a donor access node for a relay node, the method comprising:
    identifying one or more operating frequencies for a first one or more carriers deployed by the relay node; and
    determining one or more backhaul frequencies that minimize interference with the one or more operating frequencies;
    identifying a donor access node configured to deploy a first carrier utilizing a first backhaul frequency from among the one or more backhaul frequencies;
    attaching to the first carrier;
    determining one or more secondary backhaul frequencies associated with the first backhaul frequency; and
    transmitting the one or more secondary backhaul frequencies to the donor access node,
    wherein the donor access node is configured to:
        identify a second carrier deployed therefrom that utilizes a second backhaul frequency from among the one or more secondary backhaul frequencies, and
        communicate with the relay node using the first carrier as a primary component carrier and the second carrier as a secondary component carrier.

2. The method of claim 1, wherein the relay node comprises a relay wireless device communicatively coupled to a relay access point.

3. The method of claim 2, wherein:
the first one or more carriers are deployed by the relay access point, and
the relay wireless device is configured to attach to the donor access node via the first carrier.

4. The method of claim 1, wherein determining the one or more backhaul frequencies that minimize interference with the one or more operating frequencies comprises identifying frequency bands that are separated from the one or more operating frequencies by at least a threshold amount.

5. The method of claim 4, wherein the threshold amount comprises 50 MHz.

6. The method of claim 1, wherein both the first backhaul frequency and the second backhaul frequency are separated from the one or more operating frequencies by at least the threshold amount.

7. The method of claim 1, wherein the relay node is configured to relay traffic between the donor access node and one or more end-user wireless attached to the first one or more carriers.

8. A system for selecting a donor access node for a relay node, the system comprising:
a processing node; and
a processor coupled to the processing node, the processor being configured to perform operations comprising:
identifying one or more operating frequencies for a first one or more carriers deployed by a relay node, wherein the relay node is configured to relay traffic between one or more donor access nodes and one or more end-user wireless attached to the first one or more carriers;
instructing the relay node to attach to a first carrier deployed by a donor access node as a primary component carrier, the first carrier utilizing a backhaul frequency separated from the one or more operating frequencies by at least a threshold amount;
identifying one or more secondary backhaul frequencies associated with the backhaul frequency;
transmitting the one or more secondary backhaul frequencies to the donor access node, wherein the donor access node is configured to identify a second carrier deployed therefrom that utilizes a second frequency from among the one or more secondary backhaul frequencies; and
instructing the relay node to attach to a second carrier as a secondary carrier.

9. The system of claim 8, wherein the threshold amount is an amount at which the backhaul frequency causes a maximum allowable amount of interference to the one or more operating frequencies.

10. The system of claim 9, wherein the threshold amount is 50 MHz.

11. The system of claim 8, wherein both first and second carriers utilize frequencies that are separated from the one or more operating frequencies by at least the threshold amount.

12. A processing node for selecting a donor access node for a relay node, the processing node being configured to perform operations comprising:
identifying a donor access node for a relay node based on the donor access node being configured to utilize a first frequency band separated from an operating frequency of the relay node by at least a threshold amount;
instructing the relay node to attach to a first carrier deployed by the donor access node as a primary carrier, the first carrier utilizing the first frequency band;
comparing the first frequency band utilized by the donor access node with a list of known frequency bands, the list stored on the relay node;
transmitting the list of known frequency bands to the donor access node, wherein the donor access node is configured to identify a second carrier deployed therefrom that utilizes a second frequency from among the one or more secondary backhaul frequencies; and
instructing the relay node to attach to the second carrier as a secondary component carrier,
wherein the operating frequency of the relay node is used by end-user wireless devices to attach to the relay node to communicate with the donor access node via the relay node.

13. The processing node of claim 12, wherein identifying the donor access node comprises:
instructing the relay node to scan for potential donor access nodes.

14. The processing node of claim 13, wherein the operations further comprise:
determining that a second donor access node utilizes a third frequency band separated from the operating frequency of the relay node by less than the threshold amount; and instructing the relay node to avoid attempting to attach to the second donor access node.

\* \* \* \* \*